United States Patent [19]  
Tebben et al.

[11] 4,014,818  
[45] Mar. 29, 1977

[54] HIGH SURFACE AREA CATALYST COMPOSITIONS

[75] Inventors: Johannes H. Tebben, Maastricht; Cornelis A. M. Weterings, Stein, both of Netherlands

[73] Assignee: Stamicarbon B.V., Geleen, Netherlands

[22] Filed: Nov. 26, 1974

[21] Appl. No.: 527,285

[30] Foreign Application Priority Data

Nov. 28, 1973 Netherlands ............... 7316235

[52] U.S. Cl. ............................ 252/451; 252/459
[51] Int. Cl.$^2$ .................. B01J 21/08; B01J 29/10
[58] Field of Search ............... 252/452, 459, 451

[56] References Cited

UNITED STATES PATENTS

| 2,839,475 | 6/1958 | Innes | 252/451 |
| 3,668,148 | 6/1972 | Van Beek et al. | 252/459 X |
| 3,803,055 | 4/1974 | Reich | 252/459 X |

Primary Examiner—Carl F. Dees  
Attorney, Agent, or Firm—Cushman, Darby & Cushman

[57] ABSTRACT

For high-surface area hydrogenation nickel catalyst compositions, a silica carrier obtained by subjecting an alkali water glass to neutralization with sulfuric acid and spray-drying to form the silica carrier which has substantially no tendency to coalesce when used in processes requiring precipitation of an insoluble nickel compound onto the carrier.

3 Claims, No Drawings

HIGH SURFACE AREA CATALYST COMPOSITIONS

The invention is directed to high area supported nickel catalytic surfaces in hydrogenation processes.

In particular, the invention is directed to approved nickel catalyst compositions, which are characterized by high surface areas.

For hydrogenation of oils, fats and fatty acids, catalysts having a large active nickel metal surface area are desirable. It is desirous to employ catalysts supported on carriers to facilitate filterability of the used catalyst from the hydrogenated mass. Rapid transport of the hydrogen and the molecules to be hydrogenated in the granules of the catalyst imposes a requirement that the granules be as small as possible. Allowing for the filterability of the used catalyst and the hydrogenated mass a granular size of between 1 and $10\mu$ is suitable.

Currently, kieselguhr is used, as a silica carrier, in the preparation of catalyst-carrier compositions. This material involves the disadvantage of not having, itself the required large surface area (1 to about 50 $m^2$ per gram) to accommodate a large catalyst metal surface area.

Other silicas do have the required large surface area. A well-known example is a silica carrier obtained by flame-hydrolysis of $SiCl_4$. A common name for flame-hydrolysis of $SiCl_4$ is Aerosil, although this product has several common names. The specific surface area of silica produced by flame-hydrolysis of $SiCl_4$ is in the order of 200 $m^2$ per gram. The granular distribution of the material lies between 200 A and $1\mu$.

The disadvantages of employing the type of silica (formed by flame-hydrolysis of $SiCl_4$) as supports or carriers is that such silicas tend to coalesce in processes requiring precipitation of salts of hydrogenation catalyst metals onto the carrier. The tendency of these carriers to coalesce has been particularly disadvantageous in the precipitation of Ni onto these silica carriers. The carriers coalesce to a size in excess of $10\mu$. When such carriers coalesce the pore structure of the initial carrier is transformed. A direct consequence of this is that the activity and the selectivity of the hydrogenation reaction are lost to a great extent. Actually, the accessibility of the catalyst to reactants is reduced and is not increased by grinding.

The purpose of the invention is to prepare a nickel catalyst on a silica carrier, which is suitable for hydrogenation of oils, fats and fatty acids and whose catalytically active metal surface area is large, the nickel catalyst being at the same time well accessible to the reactants during usage.

SUMMARY OF THE INVENTION

According to the invention it has appeared that the above conditions are met by a silica obtained by subjecting an alkali water glass to neutralization with sulfuric acid and spray-drying. Except for the granular diameter, the texture of this silica very strongly resembles the silica obtained by flame-hydrolysis; however, during the preparation of the catalyst discussed the behaviour proves to be quite different, which could not be exspected by one skilled in the art. A silica of this kind can be prepared in a particle size up to about $10\mu$; the specific surface area amounts to approximately 140 $m^2$ per gram. It has now appeared that the particles of this carrier material, unlike the previously mentioned silica prepared from $SiCl_4$, do not coalesce during the preparation of the catalyst, as a result of which the original granular diameter of the carrier material is maintained and the catalytically active nickel is well accessible to the reactants concerned. It is noted that in the case of kieselguhr it is indeed possible to maintain the original granular diameter, but during precipitation of a nickel salt onto the kieselguhr the pore structure is changed in a nonreproducible way, which brings about said disadvantages.

An advantage of a catalyst composition prepared in accordance with the appliance of the carrier metal of the invention is the well-reproducible preparation and the higher activity, the better selectivity, and the larger number of times the same catalyst mass can be used for they hydrogenation. The said carrier material is suitable for use in forming an insoluble nickel compound precipitate on the carrier in a solution. The carrier is of particular utility in the process of forming insoluble nickel compounds precipitated by the method of precipitation deposition, in which hydroxyl ions are formed slowly and homogeneously. Such gradual and homogeneous hydroxyl ion formation may be effected by hydrolysis of urea, derivatives of urea, or any other reactants known which will produce a gradual formation of urea, as e.g. formamide or acetamide. Said carrier may be of utility in the precipitation deposition technique of catalyst metals on the carriers, in accordance with Ser. No. 361,492 filed May 18, 1973, incorporated herein by reference.

The carrier material may be used in different granular diameters, both by starting from carrier material of the required diameter, or by grinding the mass obtained after the precipitation. An extremely suitable diameter of the silica particles amounts to about $10\mu$.

DETAILED DESCRIPTION OF THE INVENTION

In accordance with the invention, the invention is directed to the formation of a supported nickel catalyst which is prepared by applying a silica carrier (silicon dioxide), obtained subjecting an alkali water glass to neutralization with an acid and spray-drying the product of such neutralization. In another aspect of the invention, the invention is directed to a high surface area hydrogenation supported nickel catalyst which comprises a finely divided nickel supported on a silica which is obtained by subjecting an alkali water glass to neutralization with an acid, and subsequently, to spray-drying the resulting product. The invention will be more fully understood by the description which follows:

One aspect of the invention is the production of a silica carrier (silicon dioxide) which has a high surface area. The silica carriers produced in accordance with the invention may have surface areas of 120 to 200 $m^2/g$ (BET). Particles of the support produced in accordance with the invention have substantially no tendency to coalesce. Particles of the support carrier produced in accordance with the invention may have particle sizes ranging between 0.1 and $90\mu$. Because of the tendency of the particles of this support not to coalesce, the pore structure of the support produced in accordance with the invention remains unaffected when used in procesess comprising the precipitation in solution of an insoluble nickel compound (nickel hydroxide or hydrated nickel oxide) onto a carrier. The fact that the pore structure of the carrier remains the same is a function of the lack of a tendency in particles of the carrier produced in accordance with the invention to coalesce. Reusability of the catalysts formed in accordance with the invention is a very important characteristic of the invention. Usually, diameters of the silica particles produced in accordance with the invention are about $10\mu$.

The silica applied as carrier of the nickel catalyst of the invention is formed by neutralizing an alkali water glass with an acid and spray-drying the product produced thereby. Alkali water glass or soda water glass is sodium silicate, in fact sodium silicate comprises sodium oxide and silicon dioxide, $Na_2O \cdot SiO_2$. The ratio of sodium oxide to silicon dioxide may vary from 2 : 1 to 1 : 3.75. The term 'water glass' is generally taken to refer to a concentrated viscous solution of sodium silicate having $SiO_2 : Na_2O$ ratio ranging from 3.75 : 1 to 1.5 : 1. These soluble sodium silicates are generally viscous acqueous alkaline solutions with a high proportion of silica largely in an ionized form.

In order to form the silica carrier, a solution of water glass is stirred and to the stirred solution of water glass is added an acid which precipitates a silicon dioxide precipitate which is spray-dried. While any mineral acid, including nitric acid, hydrochloric acid and the like may be employed, it has been found that sulfuric acid is an extremely convenient expedient for precipitating the silicon dioxide from the water glass composition. Acid is added to the water glass composition with stirring to neutralize the alkali water glass composition. On neutralization, a precipitate of silicon dioxide forms. The amount of acid needed to the alkali water glass is sufficient to cause the pH of water glass containing solution to reach a pH of 7, but not lower than a pH of 6. acidification of water glass is undertaken at ambient temperatures (room temperature). Neutralization of the water glass with acid results in the formation of a silicon dioxide precipitate and a filtrate. The precipitate is then washed with water if necessary. The residue remaining after the precipitate is washed with water forming a suspension is spray-dried. In particular, a suspension of the precipitate residue spray-dried. The technique of spray-drying is well known in the art. Spray-drying is a direct, dispersion type drying which operates on the principle of atomizing a fluid, containing the substance to be dried, to form a spray of droplets. The droplets mixed with hot gases to evaporate a liquid and to produce a dispersed, dry product. It is obvious that any spray-dryer known in the art may be used to accomplish the spray-drying of the product of the invention. Spray-dryers are generally characterized by the following features: (1) an atomizing device disperses liquid into sprays of droplets. The droplets may range in diameter from 10 to $1,000\mu$. The size of the droplets will depend on the type of atomizer, the capacity and the atomizing conditions. (2) Hot gases, contacting the spray produced by the atomizing device and evaporating moisture or fluid from the individual drops, are introduced by a variety of gas-inlet structures. (3) The residence time of the mixture of hot gases and spray droplets which produced a dry, particulate product in the dryer is highly statistical, and is dependent on the exact apparatus used. (4) The dry product and drying gases are separated to obtain the desired dry product in the form of a finely divided material. (5) The residual product is isolated from the exhaust gases. Obviously, atomization is the crux of the spray-drying process and may be accomplished by various apparatuses, including centrifugal pressure nozzles, centrifugal-discs atomizers, pneumatic atomizers, or impingement atomizers.

Spray dryers have varying capacities with respect to the liquid viscosity of the substance to be atomized. Thus, it is obvious that the suspension of the precipitate-residue, produced by neutralization of the water glass solution may vary in viscosity depending upon the capacity of the specific spray dryer used. The particle size of the silicon dioxide carrier, resulting from the spray-drying process, may range in diameter size from 0.1 to $90\mu$. Generally diameter sizes are about $10\mu$.

As stated above, the carrier produced in accordance with the invention, finds utility as a carrier for hydrogenation catalysts. In particular, the carrier produced in accordance with the invention finds utility as a carrier for hydrogenation nickel catalysts which are formed by precipitating salts of the hydrogenation catalyst metal onto the carrier of the invention.

As stated above, the carrier of the invention finds particular utility in processes wherein the catalyst nickel compound is precipitated onto the carrier from solution. What is meant by precipitating the hydrogenation nickel catalyst onto the carrier in solution includes processes wherein a soluble salt of nickel in solution, usually aqueous solution, including a carrier, is treated with a reagent to render the soluble salt insoluble. On insolubilization, obviously a precipitate forms which precipitate deposits on the carrier. The carrier containing the precipitated insoluble salt of the hydrogenation catalyst metal is isolated and the isolated material is treated to reduce the insoluble nickel compound to the free metal state. The result is that the carrier contains deposits thereon the hydrogenation catalyst in the free metal state. Reduction of the insoluble nickel compound on the carrier is usually undertaken by subjecting that material to a hydrogen atmosphere at elevated temperatures for extended periods of time.

The advantage of employing the carrier of the invention in such processes wherein a soluble salt of a hydrogenation catalyst metal is precipitated onto the carrier of the invention, is that the precipitation process does not affect the pore structure of the carrier of the invention to the disadvantage of the ultimate product. By comparison, it has been found that, when AEROSIL is used in processes wherein a soluble salt of a hydrogenation catalyst metal is precipitated onto the carrier, with subsequent reduction of the insoluble salt to produce the carrier containing the hydrogenation catalyst free metal, the diameter of the carrier particles increases to above $10\mu$. Concomitantly, the pore structure of the AEROSIL is transformed. The phenomenon of coalescing and change in pore structure is particularly evident when a soluble nickel salt is precipitated onto AEROSIL, with subsequent reduction of the insoluble nickel salt. The nickel-AEROSIL hydrogenation catalyst composition is formed of silica particles of diameters which exceed 10 $\mu$, whereas, the AEROSIL carrier, prior to precipitation of the nickel compound and reduction steps, has a granular distribution of particles of diameters lying between 200 A and 1 $\mu$The hydrogenation catalyst-carrier compositions of the invention are characterized by surface areas (BET) greater than 240 $m^2/g$. Preferably, the surface areas of the hyrogenation catalyst-carrier compositions of the invention are greater than 250 $m^2/g$. Often the hydrogenation catalyst-carrier compositions of the invention are characterized by surface areas greater than 260 m²/g. The particle sizes of the hydrogenation catalyst-carrier compositions of the invention are about 10μ in size.

The hydrogenation catalyst compositions of the invention are produced by mixing said carrier with water and a water-soluble salt of nickel. Precipitation is effected by increasing the hydroxyl ions in the solution to precipitate an insoluble compound of nickel, being the basic salt of nickel. Precipitation of said basic salt of nickel results on deposition of the basic salt onto the carrier.

The increase in hydroxyl ion may be undertaken by various methods as by including a base. Increase in hyroxyl ions is effected by including a base or by including in the solution containing the soluble salt of nickel a compound which hydrolyzes in water to generate hydroxyl ions. Substances which hydrolyze in water to generate hydroxyl ions include urea, derivatives of urea, as well as formamide or acetamide. Carbonates and bicarbonates of alkali metals may be used as a hydroxyl ion source. Any known reactants which will produce a gradual formation of hydroxyl ions may be employed.

Thus, a solution of the soluble salt of nickel in water is stirred and mixed with the carrier of the invention, in the presence of a substance which increases the hydroxide ion of the solution at temperatures above 50° C. Over a gradual period of time, the temperature of the mixture is raised to about 90 to 110° C while stirring. Stirring is continued until complete precipitation of the insoluble salt of the hydrogenation catalyst metal is effected.

The proportions of the reagents employed is not critical. Generally, the molar amount of urea exceeds the mole amount of nickel. In fact, the mole excesses of urea may be employed with respect to the molar amount of nickel. The amount of soluble salt of the metal catalyst is only dependent on the desired degree of loading of the nickel catalyst on the silica carrier.

After complete precipitation of the hydrogenation catalyst metal, the mass is filtered and washed to free the mass from inorganic contaminants. Thereafter, the mass is dried by techniques in the art. The dried mass is reduced by hydrogenation. Particularly, the dried mass is subjected to flowing hydrogen at elevated temperatures for extended periods of time. Temperatures during the reduction of the insoluble nickel compound on the carrier, to produce the hydrogenation catalyst composition of the invention, may range from 350 to 500° C.

EXPERIMENTAL

Preparation of Carrier Material in Accordance With Invention

The carrier material produced according to this invention was used as the carrier in catalyst compositions including catalysts E, F and H below.

Soda water glass was neutralized with sulfuric acid to a pH of 7. Particularly a solution of soda water glass was agitated by stirring and sulfuric acid was added to the solution, while maintaining the stirring. The temperature of the water glass was at room temperature and no heat was applied. The pH of the liquor containing the precipitate is between 6 and 7. The precipitate was then washed with water. On washing the precipitate with water, a suspension of the precipitate was formed, and the suspension was spray-dried. In the examples of catalysts A, B, C and D various other carrier materials were employed. The particle size of the dried material was between 0.1 and 90μ, from which granular fractions mentioned below were used to prepare catalysts E, F and H below in accordance with the invention.

CATALYST COMPOSITIONS

As stated above the catalyst compositions E, F, and H, below, were prepared employing the carrier formed by the process set forth above. The catalyst compositions E, F, and H were used for the hydrogenation of soybean oil. The catalysts E, F and H were compared to catalyst compositions A, B, C, D, and G. Catalyst compositions A, B, C, D and G were not prepared in accordance with the invention. The catalyst compositions A, B, C, D and G were also used to hydrogenate soybean oil. The results obtained from these comparative tests are set forth in Table I.

Catalyst A

A 5-liter flask, provided with a stirrer and a reflux cooler, was filled with 117g of kieselguhr - trade name Celatom MP 99 - , 580g of $Ni(NO_3)_2 \cdot 6 H_2O$ (= 117g of Ni), 178g of urea, and 1.5 liters of water. The kieselguhr had been ground and subsequently windsifted to obtain a granular diameter of <10μ. In 2 hours' time the temperature of the mixture was raised to 100° C, with stirring. Complete precipitation of the nickel under these conditions appears to require 10 hours, the pH of the solution setting between 5 and 6. Following the termination of the precipitation the mass was filtered and freed from nitrate by washing. Subsequently, the dried mass was reduced for 16 hours at 450° C under flowing hydrogen and, finally, absorbed in hardened fat to shield it from the air.

Catalyst B

Catalyst B was prepared in the same way as catalyst A, on the understanding that kieselguhr - trade name Celatom MP 99 - was applied for carrier material, which had a granular size of <90μ and which had been obtained by grinding and sieving. The mass obtained after termination of the precipitation was ground and windsifted to <10μ after having been washed and dried and before the reduction.

Catalyst C

Catalyst C was prepared in the same way as catalyst A, with AEROSIL 200 V for carrier material. The catalyst was prepared with 600g of urea and 580g of $Ni(NO_3)_2 \cdot 6 H_2O$ (=117g of Ni) in 1.5 liters of water.

Catalyst D

Catalyst D was prepared in the same way as catalyst C. However, after the precipitation, the washed and dried mass was ground and windsifted to a fineness of <10μ.

Catalyst E

Catalyst E was fully prepared as catalyst A, with carrier material according to the invention prepared by neutralizing sodium silicate (water glass) with sulfuric acid while stirring, washing the precipitated silica with water and spray drying a suspension of the residue to produce granular particles of a diameter of about 10μ. The washed and dried mass obtained after the precipitation was reduced for 16 hours at 480° C.

Catalyst F

Catalyst F was prepared in the same way as catalyst A, with the same carrier material as in Catalyst E having a granular diameter of 90μ. The washed and dried mass obtained after termination of the precipitation was, prior to the reduction, ground and windsifted to a fineness of <10μ.

Catalyst G

A conventional fat-hardening catalyst was obtained by nickel hydroxide precipitation on kieselguhr by means of $NaHCO_3$. A flask having a volume of 5 liters and being provided with a reflux cooler was filled with 2 liters of water, 99g of $Ni(NO_3)_2 \cdot 6 H_2O$ (=20g of Ni), and 20g of kieselguhr - trade name Celatom MP 99 - with a granular size of <10μ. The mixture was made to boil, while stirring, whereupon, with continuous stirring, 54g of $NaHCO_3$, dissolved in 1 liter of water, were added in 1 hour's time. Subsequently, the mixture was kept at the boiling temperature for 1 more hour, followed by filtration, washing, re-suspending, boiling, and re-filtration and washing. the resulting product was dried and reduced for 16 hours at 380° C under flowing hydrogen.

Catalyst H

Catalyst H was prepared according to the method of catalyst G on a carrier material as in Examples E and F, the granular size mounting to <10μ.

The catalysts A-H were tested for hydrogenation of soybean oil, which was done in an autoclave equipped with a stirrer. The temperature was approximately 380° C, the hydrogen pressure was 1 bar, and the rate of the stirrer was about 1,000 revolutions per minute. The weight percentage of catalytically active nickel in the oil to be hydrogenated invariably amounted to 0.015.

The comparative results of Table I relate to the activity, the selectivity, the number of times re-using is possible, and the weight percentage of fatty acids with a trans-double bond after the hydrogenation to an iodine number of 80. For determining the selectivity a distinction was made between the linolenic acid selectivity K-1 and the linoleic acid selectivity K-2.

The linolenic acid selectivity K-1 represents the preferred hydrogenation reaction of linolenic acid ($C_{18}^{\equiv}$) as compared with linoleic acid ($C_{18}^{=}$). K-1 is of importance in retaining a high percentage of linoleic acid while the linolenic acid, which is subject to deterioration, is removed. With nickel catalysts, K-1 varies from 1.0 to 2.8, see Johnston et al., J.A.O.C. (Journal of the American Oil Chemists Society) 39, 273 (1962) which is incorporated herein by reference. A K-1 value of 2.7, for soybean oil, corresponds with a decrease of the linolenic acid content from 8.0 to 1.0% by weight at an iodine number of 98; 54% of the original linoleic acid is still present then. In the case of $K_1 = 1.2$ these figures amount to, respectively, 84 and 19% of the linoleic acid originally present. K-1 was determined according to the graphic method of Allen, see Allen R. R. J.A.O.C., 44, 466–467 (1967) which is incorporated herein by reference.

The linoleic acid selectivity K-2 is the preferred hydrogenation of linoleic acid (C-18) as compared with oleic acid (C-18). The linoleic acid selectivity can be determined from the fatty acid composition of the original and the hydrogenated soybean oil: see Albright L. F. J.A.O.C., 42, 250 (1965) which is incorporated herein by reference. At K-2 < 7.5 the catalyst is not considered selective. If K-2 > 31 the catalyst is called selective (see the literature referred to by Albright L. F.). With a selective catalyst there is little hyrogenation into stearic acid; fat hardening is principally achieved by isomerization of oleic acid into elaidic acid.

The 're-usability' of the catalysts, abbreviated in the tables to re-us., was determined by the hydrogenation of soybean oil at 185° C with 0.2% by weight of nickel as compared with the soybean oil. After the soybean oil had been hydrogenated to the iodine number 80, the catalyst was filtered off and used for a new soybean oil batch. The abbreviation 're-us.' indicates the number of soybean oil batches that can be hydrogenated with a certain quantity of catalyst according to the method described above without the time required to hydrogenate soybean oil to the iodine number 80 exceeding 4 hours.

The table clearly shows that the catalysts prepared according to the process of the invention - in comparison with catalysts with the usual carrier materials - yield better results in the hydrogenation of oil, in relation to activity, selectivity and re-usability, than do the catalysts with the usual carrier materials. An additional advantage of the catalysts prepared according to the invention is the great capacity for cistrans isomerization (see table). This makes it possible for hardening to be achieved without formation of stearic acid, which is not desirable in the preparation of margarine.

Table I

| catalyst | texture before precipitation BET-surface area dia <10μ | | texture after precipitation BET-surface area dia <10μ carrier | | | results of hydrogenation | | | | |
|---|---|---|---|---|---|---|---|---|---|---|
| | m²/g | % | $\frac{m^2 Ni}{g\,Ni}$ | m²/g | % | activity 1H₂/kg Ni | selectivity K1 | K2 | re-us. | %trans |
| A | 15 | 98 | 75 | 247 | 94 | 509 | 2.6 | 21 | 6 | 32 |
| B | 15 | 23¹⁾ | 27 | 268 | 97 | 352 | 2.4 | 14 | 4 | 31 |
| C | 215 | 100²⁾ | 116 | 608 | 44 | 540 | 2.1 | 23 | 6 | 29 |
| D | 215 | 100²⁾ | 131 | 600 | 99(ground) | 540 | 2.6 | 25 | 6 | 29 |
| E* | 140 | 97 | 138 | 268 | 99 | 765 | 1.8 | >50 | 10 | 37 |
| F* | 140 | 27 | 123 | 283 | 98(ground) | 732 | 2.0 | >50 | 10 | 36 |
| G | 15 | 98 | 68 | 298 | 95 | 384 | 1.6 | 30 | 5 | 31 |
| H* | 140 | 97 | 144 | 407 | 96 | 655 | 1.8 | >50 | 9 | 36 |

*prepared with carrier material according to the invention
¹⁾100 % < 90 μ
²⁾100 % < 1 μ

What is claimed is:

1. A supported nickel catalyst composition for hydrogenating oils, fats and fatty acids, comprising (a) silica as a supporting material and (b) free metallic nickel as the catalytically active material which is supported by said silica, wherein said silica is prepared by providing an alkali water glass; adding acid to said water glass to form a precipitate of silica and drying the silica by spray drying to form said supporting material; mixing said carrier with water and a water-soluble salt of said nickel; forming an insoluble salt of said nickel on said carrier, by increasing the concentration of hydroxyl ions in the solution; and reducing the nickel compound on said carrier to form the nickel metal catalyst on said carrier.

2. The process of claim 1, wherein the acid added to the alkali water glass is sulfuric acid.

3. An improvement in the process of depositing a hydrogenation nickel metal catalyst on a silica carrier, comprising suspending a silica carrier in an aqueous solution containing a water soluble salt of a catalyst metal and precipitating said water soluble salt on said carrier by increasing the hydroxyl ions in said aqueous solution, with subsequent reduction of the insoluble catalyst metal compound to form the free metal catalyst deposited on said carrier, said improvement comprising applying a silica carrier prepared by providing an alkali water glass acidifying the water glass with sulfuric acid to form a precipitate, forming a suspension of said precipitate and spray drying a suspension of said precipitate.

* * * * *